US006606668B1

(12) United States Patent
MeLampy et al.

(10) Patent No.: US 6,606,668 B1
(45) Date of Patent: Aug. 12, 2003

(54) SYSTEM AND METHOD FOR LEAST COST ROUTING AND MANAGING MULTIPLE GATEKEEPERS ON A PACKET SWITCHED NETWORK

(75) Inventors: Patrick J. MeLampy, Pepperell; Robert F. Penfield, Maynard, both of MA (US)

(73) Assignee: Priority Call Management, Inc., Wilmington, MA (US)

( * ) Notice: Subject to any disclaimer, the term of this patent is extended or adjusted under 35 U.S.C. 154(b) by 0 days.

(21) Appl. No.: 09/154,536

(22) Filed: Sep. 16, 1998

Related U.S. Application Data (63) Continuation-in-part of application No. 08/905,589, filed on Aug. 4, 1997, now Pat. No. 5,841,854, which is a continuation of application No. 08/473,674, filed on Jun. 7, 1995, which is a continuation-in-part of application No. 08/198,032, filed on Feb. 16, 1994, now abandoned.
(60) Provisional application No. 60/098,095, filed on Aug. 27, 1998.

(51) Int. Cl.[7] .................. G06F 15/173; H04M 15/00
(52) U.S. Cl. ..................... 709/241; 379/114.02
(58) Field of Search ................ 709/238, 239, 709/241; 379/115, 114; 348/2, 3, 7, 12, 1

(56) References Cited

U.S. PATENT DOCUMENTS

| | | |
|---|---|---|
| 4,439,636 A | 3/1984 | Newkirk et al. |
| 4,518,824 A | 5/1985 | Mondardini |
| 4,706,275 A | 11/1987 | Kamil |
| 4,860,346 A | 8/1989 | Mellon |
| 4,897,870 A | 1/1990 | Golden |
| 4,942,598 A | 7/1990 | Davis .................. 379/57 |
| 4,975,942 A | 12/1990 | Zebryk |
| 5,155,342 A | 10/1992 | Urano |
| 5,163,086 A | 11/1992 | Ahearn et al. |
| 5,226,073 A | 7/1993 | Albal et al. |
| 5,359,642 A | 10/1994 | Castro |
| 5,408,519 A | 4/1995 | Pierce et al. |
| 5,425,084 A * | 6/1995 | Brinskele .................. 379/112 |
| 5,577,109 A | 11/1996 | Stimson et al. |
| 5,583,920 A * | 12/1996 | Wheeler, Jr. .......... 379/114.29 |
| 5,621,787 A | 4/1997 | McKoy et al. |
| 5,696,906 A | 12/1997 | Peters et al. |

(List continued on next page.)

FOREIGN PATENT DOCUMENTS

| | | | |
|---|---|---|---|
| EP | 0848560 | 6/1998 | |
| WO | WO 91/07838 | 5/1991 | |
| WO | WO98/17048 | * 4/1998 | .......... H04M/3/50 |
| WO | WO99/09752 | * 2/1999 | .......... H04Q/3/00 |
| WO | WO 00/48380 | 8/2000 | |

OTHER PUBLICATIONS

Moyal, RADVision "H.323 Building Blocks", TeleCon XVII Intel "H.323 Everywhere" seminars, 22 pages, Nov. 1997.*

(List continued on next page.)

Primary Examiner—Robert B. Harrell
Assistant Examiner—Bunjob Jaroenchonwanit
(74) Attorney, Agent, or Firm—Dority & Manning; Leonard W. Pojunas, Jr., Esq.

(57) ABSTRACT

A method and system for managing a large network of switching end-points to route calls by time of day and day of week over a packet switched network (ATM or Voice over IP). The preferred management mechanisms determine circuit and location availability and include means for removal and replacement of circuits from network-wide service, even in a private, packet-switched network. In an automatic call distribution environment, the method is an economical and efficient process for facilitating a caller's ability to access users in workgroups wherein the users utilize either wired or wireless communications tools. Users are chosen via a rule-based selection process including access to a database of users, caller-screened information, and circuit and location availability.

60 Claims, 8 Drawing Sheets

U.S. PATENT DOCUMENTS

| | | | |
|---|---|---|---|
| 5,721,768 A | | 2/1998 | Stimson et al. |
| 5,749,075 A | | 5/1998 | Toader et al. |
| 5,751,706 A | | 5/1998 | Land et al. ............... 370/352 |
| 5,764,747 A | | 6/1998 | Yue et al. .................. 379/210 |
| 5,781,620 A | * | 7/1998 | Montgomery et al. ...... 379/115 |
| 6,005,926 A | * | 12/1999 | Mashinsky ............ 379/114.02 |
| 6,006,253 A | * | 12/1999 | Kumar et al. ............... 709/204 |
| 6,018,360 A | * | 1/2000 | Stewart et al. ................ 348/15 |
| 6,067,529 A | * | 5/2000 | Ray et al. ..................... 705/26 |
| 6,351,453 B1 | * | 2/2002 | Nolting et al. ............. 370/232 |

OTHER PUBLICATIONS

Linberge, H.323 Multimedia conferencing for packet switched networks, http://standards.pictel.com, 26 pages, Jun. 1997.*

RADVision, Begins Licensing Stand–Alone H.323 Gatekeeper, http://www.radision.com/news/press/gatekeep.html, 3 pages, Nov. 1997.*

, New Enhancements to radvision's on LAN H.323 . . . , Voice over IP features, 3 pages, Nov. 1997.*

* cited by examiner

FIG. 1

| CARRIER IDX 52 | CARRIER NAME 54 | SSP ID 56 | PREFIX 58 | DATE·TIME RANGE 60 | COST 62 |
|---|---|---|---|---|---|
| 1 | ATT | 1 | 1- | 0:0-24:0 | 0.10 |
| 2 | BELL ATLANTIC | 1 | 1-617 | 0:0-24:0 | 0.05 |
| 3 | MCI | 2 | 44- | 0:0-24:0 | 0.35 |
| 4 | PACIFIC BELL | 2 | 1-978 | 0:0-24:0 | 0.09 |
| 5 | BRITISH TELECOM | 3 | 44- | 0:0-24:0 | 0.13 |
| 5 | MERCURY | 3 | 441- | 0:0-24:0 | 0.12 |

CONTENTS OF RESPONSE "B"

| NO. OF SSPs IN RESPONSE | SSP NO. | NO. OF CORRESPONDING CARRIERS | CARRIER IDX | CIRCUITS AVAILABLE | CARRIER IDX | CIRCUITS AVAILABLE |
|---|---|---|---|---|---|---|
| 2 | 2 | 2 | 3 | 8 | 4 | 0 |
| 80 | 82 | 84 | 86 | 88 | 90 | 92 |

| SSP NO. | NO. OF CORRESPONDING CARRIERS | CARRIER IDX | CIRCUITS AVAILABLE | CARRIER IDX | CIRCUITS AVAILABLE |
|---|---|---|---|---|---|
| 3 | 2 | 5 | 6 | 6 | 25 |
| 94 | 96 | 98 | 100 | 102 | 104 |

| NO. OF SSPs | CARRIER PER SSP | | |
|---|---|---|---|
| | 5 | 10 | 20 |
| 5 | 122 | 222 | 422 |
| 10 | 242 | 442 | 842 |
| 25 | 602 | 1102 | 2102 |
| 100 | 2402 | 4402 | 8402 |

SYSTEM AND METHOD FOR LEAST COST ROUTING AND MANAGING MULTIPLE GATEKEEPERS ON A PACKET SWITCHED NETWORK

RELATED APPLICATIONS

This application depends for priority upon U.S. Provisional Patent Application Serial No. 60/098,095, entitled SYSTEM AND METHOD FOR UBIQUITOUS IP SERVICES, LEAST COST ROUTING, AND MANAGING MULTIPLE GATEKEEPERS ON A PACKET SWITCHED NETWORK, filed Aug. 27, 1998, which is incorporated herein by reference. Also, this application is a continuation-in-part of U.S. Patent Application Serial No. 08/905,589 filed Aug. 4, 1997, and issued as U.S. Pat. No. 5,841,854 on Nov. 24, 1998, which is a continuation of U.S. Patent Application Serial No. 08/473,674, filed Jun. 7, 1995, which is a continuation-in-part of U.S. Patent Application Serial No. 08/198,032, filed Feb. 16, 1994, now abandoned.

FIELD OF THE INVENTION

The present invention relates generally to the field of electronic transaction processing via IP telephony, and more specifically to least cost call routing in a mixed packet and circuit switched network in an automatic call distribution environment.

BACKGROUND OF THE INVENTION

Packet Switched networks are viewed in the telephony art as a very efficient mechanism for transmitting digitally encoded voice. With the advent of standards for signaling and compression, it appears that a new world-wide standard is emerging which may reduce costs for carriers by simplifying interconnection, avoiding international regulatory costs and barriers, and utilizing less bandwidth for voice calls.

The standards that are emerging for packet switching are defined collectively as H.323. These standards are colloquially known as Voice over IP, or commonly shortened to VoIP. The standards define methods for establishing telephone calls (H.245/Q.931) with compressed audio (Q.723.2). These standards are all available from the International Telecommunications Union (ITU) and are incorporated herein by reference.

Data networking companies such as Cisco of San Jose Calif. produce products that conform to these standards, such as the Cisco 5300 Router. These products can be used to convert traditional telecommunications transport such as T1 with channel associated signaling or common channel signaling to H.245/Q.723.2 and back. Thus traditional voice is routed over IP networks efficiently. By incorporating other network elements such as packet switches, it is believed that new networks which carry voice and data efficiently will replace and/or compete with today's telecommunications transit networks.

Least Cost Routing and Management through a Large Packet Switched Network (ATM or VoIP)

Large packet switched networks are excellent at routing packets from source to destination. With the inclusion of the QoS (Quality of Service) and other mechanisms to guarantee quality and performance, these networks have become effective mechanisms for transporting voice as well as data.

With the advent of H.323 standards, a gatekeeper concept was developed which permits a form of telephone signaling (Q.931) over packet switched networks. The gatekeepers were added to perform several functions. One function is to provide access control to resources managed by the gatekeeper. Another function is to provide addressing and allocation services to enable circuit based signaling protocols to work. Thus Q.931 (ISDN Call Control) can be used to establish calls with a gatekeeper.

The gatekeeper mechanism can perform sufficiently in many cases. However, drawbacks are believed to exist in today's H.323 VoIP networks. In particular, the standard mechanisms for Least Cost Routing and selection of a gatekeeper are inadequate because circuit availability, on the PSTN side of the gateway, is unknown to the gatekeeper. In other words, a gatekeeper does not know when an apparently unused PSTN circuit is in fact being used, thereby decreasing the likelihood that available bandwidth will be used optimally.

Least Cost Routing through a Large Packet Switched Network in an Automatic Call Distribution Environment Automatic Call Distributors (ACD) are specialized phone systems used for handling many incoming calls. Once used only by airlines, rent-a-car companies, and hotel chains, ACDs are now used by numerous companies facing a heavy load of incoming calls (e.g., order taking, dispatching of service technicians, taxis, railroads, help desks, and answering technical questions).

An ACD performs four functions. First, it will recognize and answer an incoming call. Second, it will look in its database for instructions on what to do with that call. Third, based on the instructions found, it will send the caller either a recording asking the caller to continue to hold the line, or to a voice response unit (VRU). Fourth, it will send the call to an agent as soon as that agent has completed his or her previous call, and/or the caller has heard a prerecorded hold message.

The term Automatic Call Distributor arose from the device's function of distributing incoming calls in some logical pattern to a group of operators. That pattern might be Uniform (i.e., distribute the work uniformly) or it may be Top-Down (i.e., the same agents in the same order get the calls and are kept busy—the ones on the top are kept busier than the ones on the bottom). Alternatively, the pattern may include specialty routing, where the calls are routed to answerers who are most likely to be able to help the caller.

While distributing calls logically is the function most commonly associated with an ACD, it is not the ACD's only function. Larger ACDs are used in call centers—a facility where calls are answered and made. A call center will typically have several people (also called agents), an ACD, and a computer for order-entry and look up on customers' orders.

Some call centers are further identified as being in-bound call centers and/or out-bound call centers. In-bound call centers only process received calls. Typical applications include catalog sales, customer service, ticket sales, etc. Out-bound call centers only process calls initiated within the out-bound center. Typical applications include telephone sales, fund-raising and general solicitation.

Existing ACD systems provide status reports and real time monitors to provide management and maintenance of call handling, call duration and call resource capabilities, and provide supervisor monitoring capability. Monitoring allows a group supervisor to listen in on conversations to check for correct implementation of procedures. Existing ACD systems provide for links via data communication channels to customers' Management Information Systems to select caller related data and to assist in delivering calls to agents.

However, all existing ACD systems known to the inventors fail to provide call distribution to agents via packet switched networks. Furthermore, existing ACD systems do not provide call distribution via packet switched networks using mechanisms to detect, in real time, changes in circuit availability on the PSTN side of a gateway.

SUMMARY OF THE INVENTION

To address a shortcoming in the available art, the present invention transports, in real time, the "subscriber session" to a foreign point of presence offering the complete set of features and data remotely that are available when accessing the home system directly.

To address another shortcoming in the available art, the present invention provides a system and method that promotes least cost carrier selection across a packet switched network using mechanisms to detect, in real time, changes in circuit availability on the PSTN side of a gateway.

To address a further shortcoming in the available art, the present invention provides a system and method that promotes least cost routing through a packet switched network in an automatic call distribution environment.

To address still another shortcoming in the available art, the present invention provides a mechanism for selecting the least cost route with a reasonably high certainty that a circuit will be available.

To address yet another shortcoming in the available art, the present invention provides a mechanism for managing bandwidth to various endpoints in the network.

Briefly stated, the present invention provides a method and system for managing a large network of switching end-points to route calls by time of day and day of week over a packet switched network (ATM or Voice over IP). The preferred management mechanisms determine circuit and location availability and include means for removal and replacement of circuits from network-wide service, even in a private, packet-switched network. In an automatic call distribution environment, the method is an economical and efficient process for facilitating a caller's ability to access users in workgroups wherein the users utilize either wired or wireless communications tools. Users are chosen via a rule-based selection process including access to a database of users, caller-screened information, and circuit and location availability.

An advantage of the present invention provides a mixed circuit and packet switched system that includes a packet switched network, a circuit switched network having a plurality of available circuits, and a gateway interconnecting the packet switched network and the circuit switched network. The system also includes a gatekeeper that is in communication with the gateway such that the gatekeeper controls a flow of data through the gateway. The system further includes an SMP in communication with the gatekeeper and the circuit switched network such that the SMP prompts the gatekeeper to permit the flow of data through the gateway if the SMP detects a predetermined number of available circuits in the circuit switched network.

Another advantage of the present invention provides a method for routing a call from a local service switching point to a remote service switching point via a packet switch network interconnected to the remote service switching point by a gateway and a gatekeeper controlling call pathways through the gateway to the remote service switching point, the method including the steps of providing the local service switching point with a record identifying a plurality of carriers serving the remote service switching point, the record including a cost for using each identified carrier and a number of available circuits in each identified carrier, receiving a call and destination number at the local service switching point, and selecting a carrier from the record, the selected carrier having a predetermined number of available circuits that can connect the received call to the destination number for the lowest cost.

Yet another advantage of the present invention provides a system for routing a call from a local service switching point to a remote service switching point via a packet switched network interconnected to the remote service switching point by a gateway and a gatekeeper controlling call pathways through the gateway to the remote service switching point, the system including means for providing the local service switching point with a record identifying a plurality of carriers serving the remote service switching point, the record including a cost for using each identified carrier and a number of available circuits in each identified carrier, means for receiving a call and destination number at the local service switching point, and means for selecting a carrier from the record, the selected carrier having a predetermined number of available circuits that can connect the received call to the destination number for the lowest cost.

A further advantage of the present invention provides a mixed circuit and packet switched system, the system including a packet switched network, a circuit switched network having a plurality of carriers, each carrier containing a dynamically varying number of available circuits, a plurality of service switching points in communication with the circuit switched network, each service switching point associated with a carrier such that each service switching point can direct a telephone call over an available circuit in the associated carrier, each service switching point containing a global circuit availability record, the global circuit availability record providing circuit availability for every carrier associated with the plurality of service switching points, a plurality of gateways interconnecting the packet switched network and the circuit switched network, each gateway in communication with a service switching point such that a telephone call can be carried between the service switching point and the packet switched network via the gateway, a plurality of gatekeepers, each gatekeeper in communication with a gateway such that each gatekeeper controls a connection of a telephone call between the packet switched network and the circuit switched network via the gateway, each gatekeeper in communication with a service switching point such that the gatekeeper permits the connection of the telephone call through the gateway in response to a prompt from the service switching point, and wherein a first service switching point receives an incoming call on an associated carrier and directs the received call, via the packet switched network, to a gateway in communication with a second service switching point after prompting a gatekeeper in communication with the gateway, the first service switching point selecting the second service switching point from the plurality of service switching points based on a global circuit availability record contained in the first service switching point.

A still further advantage of the present invention provides a system for routing a call via a packet switched network having a gateway and a gatekeeper controlling call pathways through the gateway, the system including a remote service switching point, a local service switching point in communication with the remote gateway and the remote gatekeeper via the packet switched network, the local service switching point containing a global record identifying a plurality of carriers that serve the remote service switching point, the global record including a cost of using each identified carrier and a number of available circuits in each identified carrier, and wherein the local service switching point selects a carrier from the global record in response to receiving an incoming call and a destination number, the selected carrier having a predetermined number of circuits that can connect the incoming call to the destination number for the lowest cost.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE DRAWINGS

Figure 1:
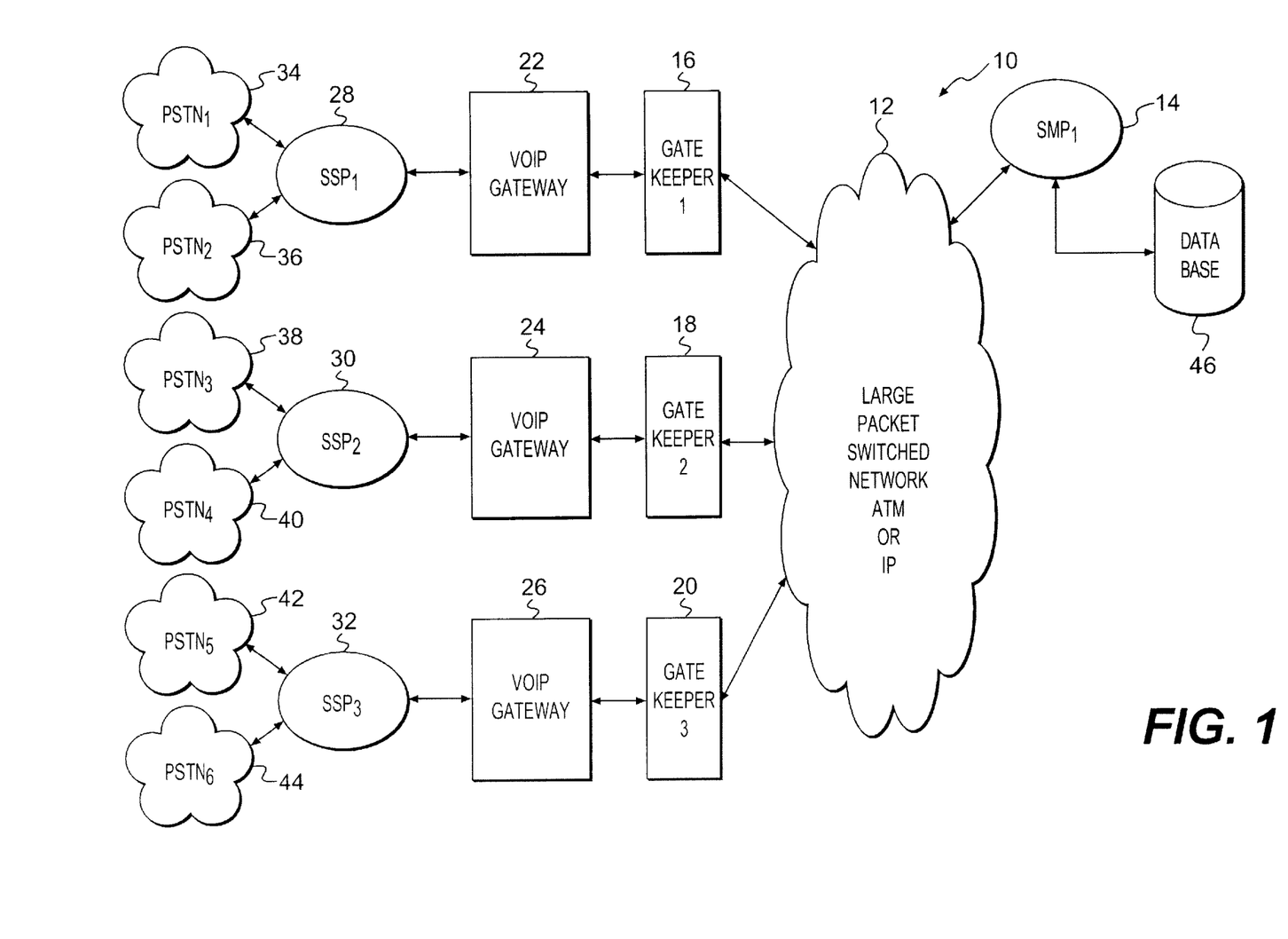
FIG. 1 is a diagrammatic view of the mixed circuit and packet switched network of the present invention.

Referring now to FIG. 1, the mixed circuit and packet switching system 10 of the present invention is shown. The system 10 includes a packet switched network 12 (e.g., ATM (Asynchronous Transfer Mode) or IP (Internet Protocol)) that interconnects a management station or SMP 14 (System Management Point) and a plurality of gatekeepers 16, 18, 20. Each gatekeeper 16, 18, and 20 is connected to a corresponding gateway 22, 24, 26. One example of a gateway is the Cisco 5300 router manufactured by Cisco of San Jose, Calif. A gateway acts as an interface between a circuit switched network and a packet switched network. A gatekeeper controls the ability of an SSP (Service Switching Point) to access the packet switched network 12. As shown in FIG. 1, gatekeeper 16 controls the ability of SSP 28 to access packet switched network 12 via gateway 22, gatekeeper 18 controls the ability of SSP 30 to access packet switched network 12 via gateway 24, and gatekeeper 20 controls the ability of SSP 32 to access packet switched network 12 via gateway 26.

Each SSP 28, 30, 32 is connected to a pair of PSTN (Public Switched Telephone Network) carriers. As shown, SSP 28 is connected to PSTN carrier 34 (e.g., AT&T) and PSTN carrier 36 (e.g., Bell Atlantic), SSP 30 is connected to PSTN carrier 38 (e.g., MCI) and PSTN carrier 40 (e.g., Pacific Bell), and SSP 32 is connected to PSTN carrier 42 (e.g., British Telecom) and PSTN carrier 44 (e.g., Mercury). As discussed below, each PSTN carrier may have a number of unused circuits at any given time. The unused circuits may be used to route a telephone call.

SMP 14 is also in communication with a database 46. As discussed below, SMP 14 monitors the SSPs 28, 30, 32 and the corresponding carriers 34–46 to keep track of the current cost to use each carrier and the number of unused circuits available on each carrier. SMP 14 stores the cost and availability data in database 46.

Figure 2:
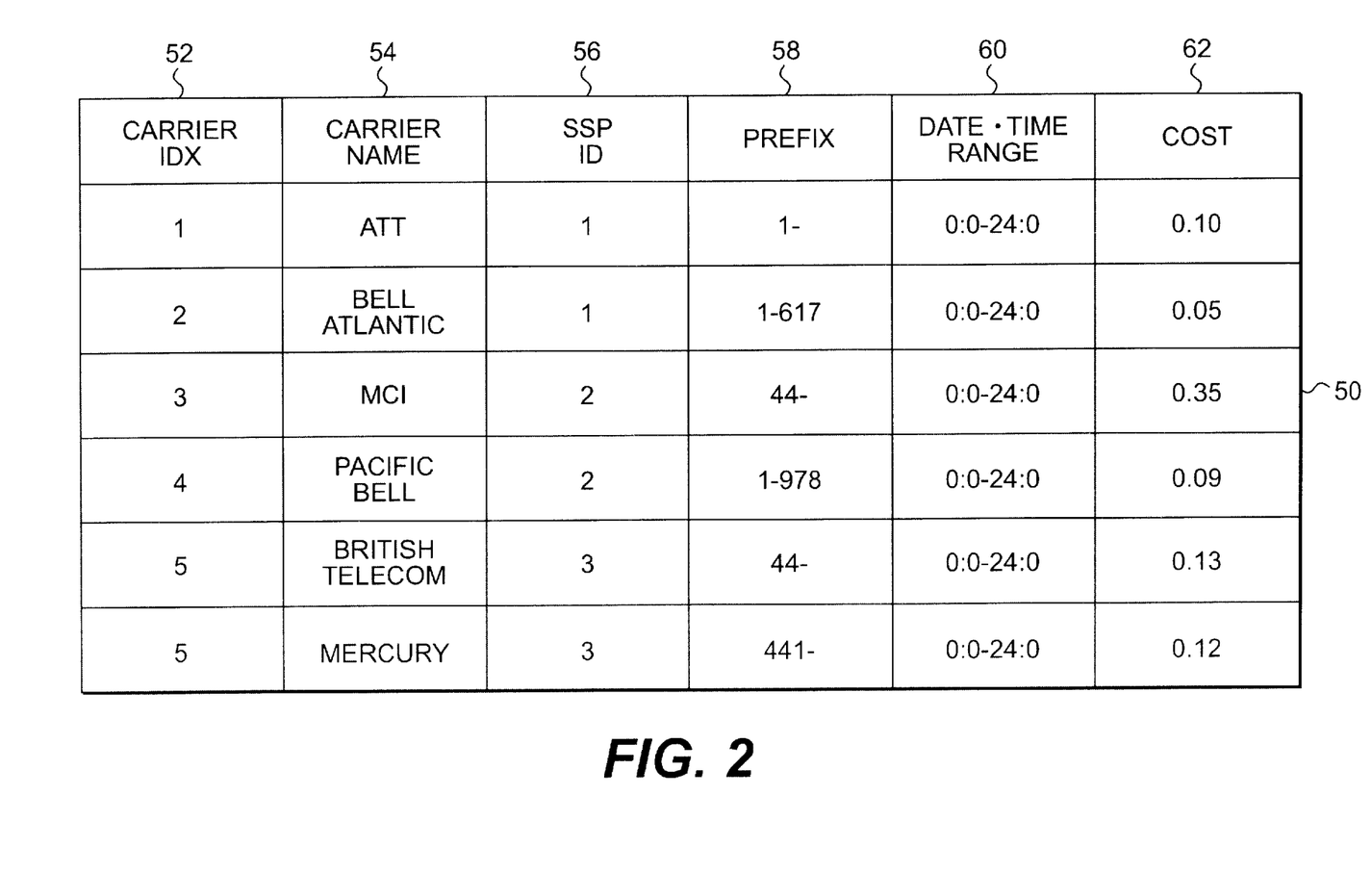
FIG. 2 is a table illustrating data collected and stored by the SMP in the network of FIG. 1.

Referring now to FIG. 2, the stored cost and availability data is illustrated in the form of a table 50. The table 50 is stored on the SMP database 46 and is managed and updated by the SMP 14. As discussed below, the data in the table 50 is periodically sent from the SMP 14 to the SSPs 28, 30, 32. The table 50 includes a carrier IDX column 52, a carrier name column 54, an SSP ID column 54, a destination number Prefix column 56, a Date/Time range column 58, and a carrier cost column 60. The cost to use each identified carrier varies based on the originating SSP, time of day, day of week (not shown), day of month (not shown), destination number prefix, and the type or class of call (not shown).

Figure 3:
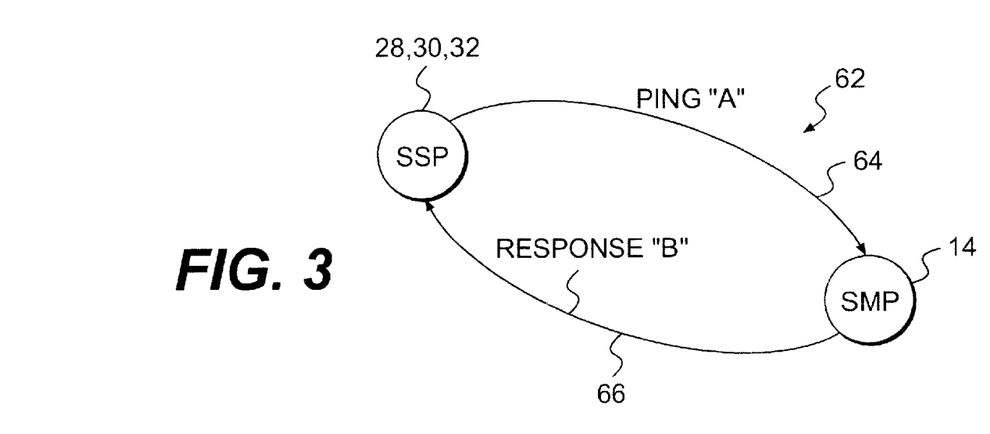
FIG. 3 is a diagrammatic view of a ping/response communication between an SSP and an SMP of the present invention.

Referring now to FIG. 3, an updating communication 62 between the SMP 14 and one of the SSPs 28, 30, 32 is shown. (It should be noted that the other elements of network 10 are omitted from FIG. 3 to avoid confusion). The updating communication 62 includes a ping signal sent from SSP 28, 30 or 32 to SMP 14. The updating communication also includes a response signal 66 sent from SMP 14 to SSP 28, 30 or 32. The updating communication occurs over programmable predetermined time intervals. A preferred time interval is once every five seconds.

The updating communication (or polling) between the SMP and the SSPs in the network is a important process in the present invention. The updating communication is used to send an SSP's current circuit availability to an SMP, and to send a global SSP circuit availability to the SSP. In order for the circuit availability to be meaningful, the circuit availability must be globally available (network-wide) and dynamically upgradable. The updating communication is described below and is described in further detail in copending U.S. patent application Ser. No. 09/135,607 to McLampy et al., filed Aug. 18, 1998, incorporated herein in its entirety by reference.

Figure 4:
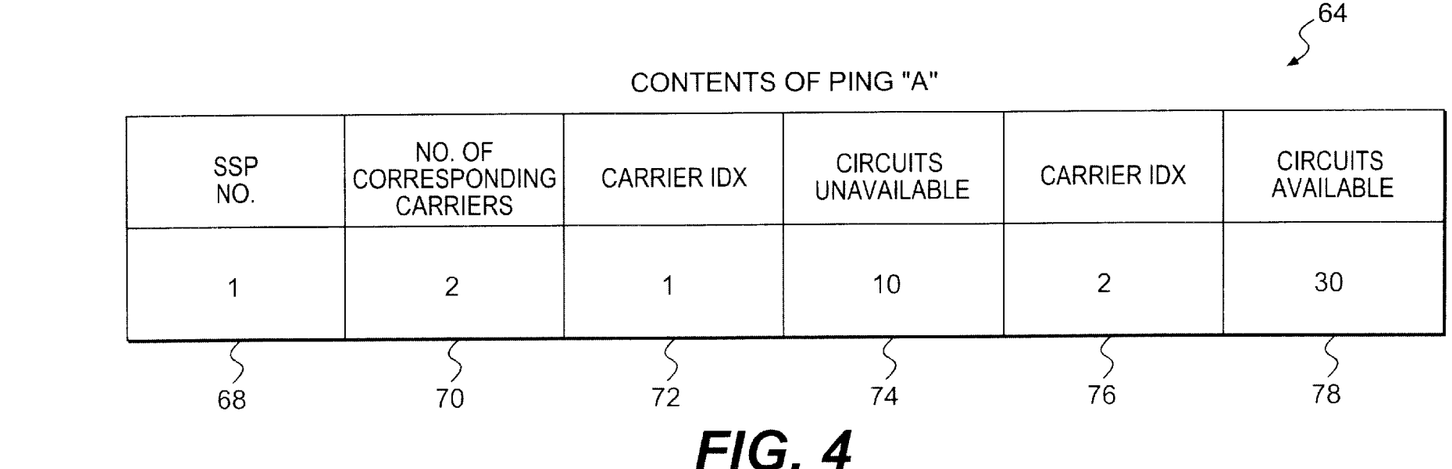
FIG. 4 is a diagram illustrating the contents of the ping signal shown in FIG. 3.

Referring now to FIG. 4, together with FIGS. 1–3, a ping signal 64 of an updating communication 62 between SSP 28 and SMP 14 is shown. The ping signal 64 has a length of 12 bytes and is divided into six 16 bit sections. The ping signal 64 includes an SSP ID section 68, a section 70 containing the number of carriers connected to the SSP 28, a section 72 containing the IDX of a first carrier (AT&T 34) connected to the SSP 28, a section 74 containing the number of circuits available in the first carrier at the time the ping signal was transmitted, a section 76 containing the IDX of a second carrier (Bell Atlantic 36) connected to the SSP 28, and a section 78 containing the number of circuits available in the second carrier at the time the ping signal was transmitted. It should be noted that the number of sections in a ping signal will vary at least in accordance with the number of carriers connected to the SSP that generates the ping signal.

When the SMP 14 receives the ping signal 64, SMP 14 updates the database 46 to reflect any changes in the number of carriers connected to SSP 28 as well as any changes in the number of available circuits on the carriers. Although not shown in FIG. 3, SMP 14 can also update the database 46 to reflect any changes in the cost to use the identified carriers.

Figure 5:
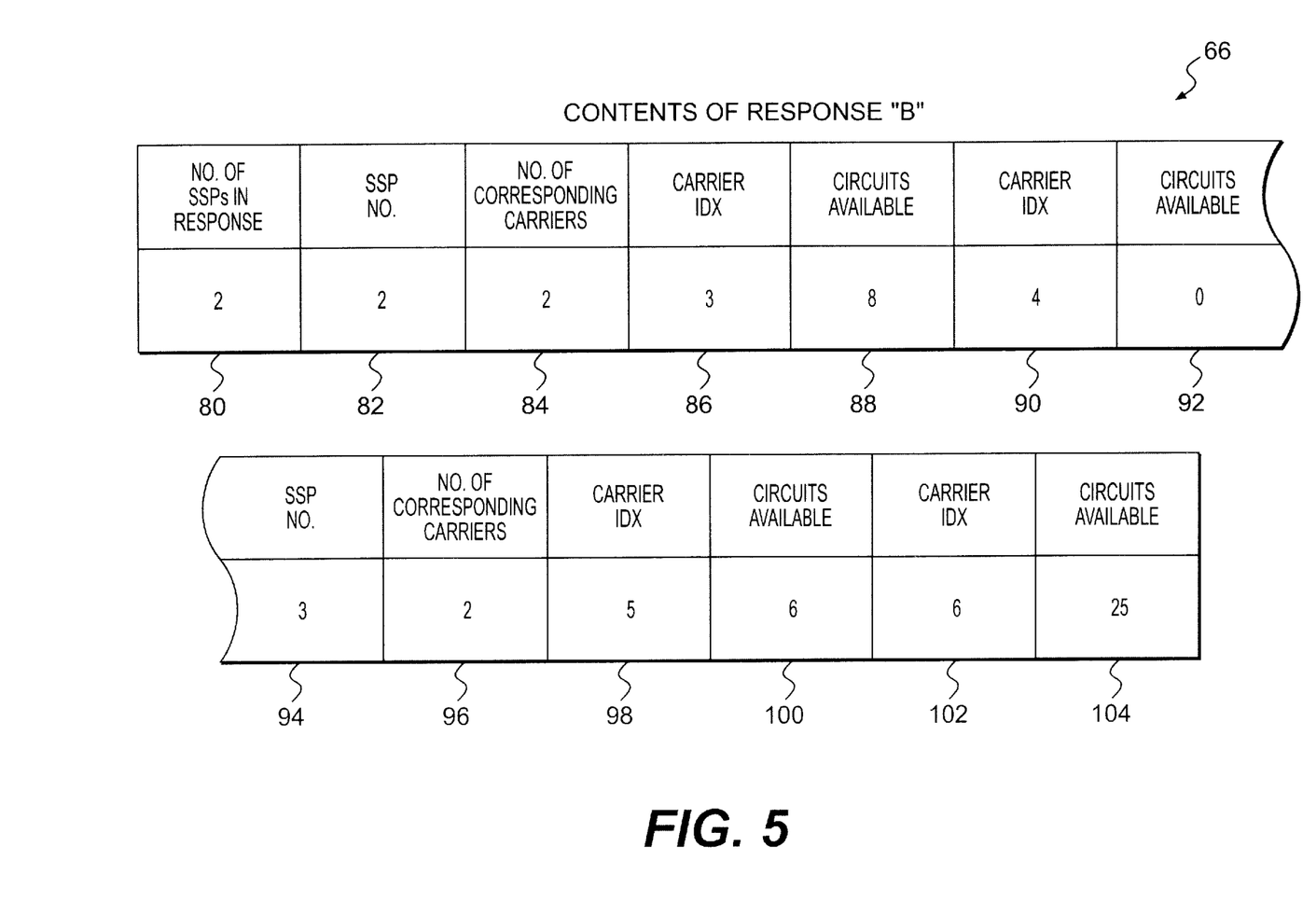
FIG. 5 is a diagram illustrating the contents of the response signal shown in FIG. 3.

Referring now to FIG. 5, together with FIGS. 1–3, a response signal 66 of an updating communication 62 between SSP 28 and SMP 14 is shown. The response signal 66 has a length of 26 bytes and is divided into thirteen 16 bit sections. The response signal includes a section 80 containing the number of SSPs currently in the network 10 (this does not include SSP 28), a first SSP ID section 82 (SSP 30 is identified), a section 84 containing the number of carriers connected to the identified SSP, a section 86 containing the IDX of a first carrier (MCI 38) connected to the identified SSP, a section 88 containing the number of circuits available in the first carrier at the time the response signal was transmitted, a section 100 containing the IDX of a second carrier (Pacific Bell 40) connected to the identified SSP, and a section 102 containing the number of circuits available in the second carrier at the time the response signal was transmitted.

The response signal 80 also contains a second SSP ID section 104 (SSP 32 is identified), a section 106 containing the number of carriers connected to the identified SSP, a section 108 containing the IDX of a first carrier (British Telecom 42) connected to the identified SSP, a section 110 containing the number of circuits available in the first carrier at the time the response signal was transmitted, a section 112 containing the IDX of a second carrier (Mercury 40) connected to the identified SSP, and a section 114 containing the number of circuits available in the second carrier at the time the response signal was transmitted.

It should be noted that the number of sections in a response signal will vary at least in accordance with the number SSPs present in the network and the number of carriers connected to the SSPs.

When SSP 28 receives the response signal 66, SSP 28 compares the received carrier and SSP records to a set of stored records. If any changes have occurred, SSP 28 updates its stored records. Although not shown in FIG. 4, SSP 28 can also update cost records to reflect any changes in the cost to use available carrier circuits.

Figure 6:
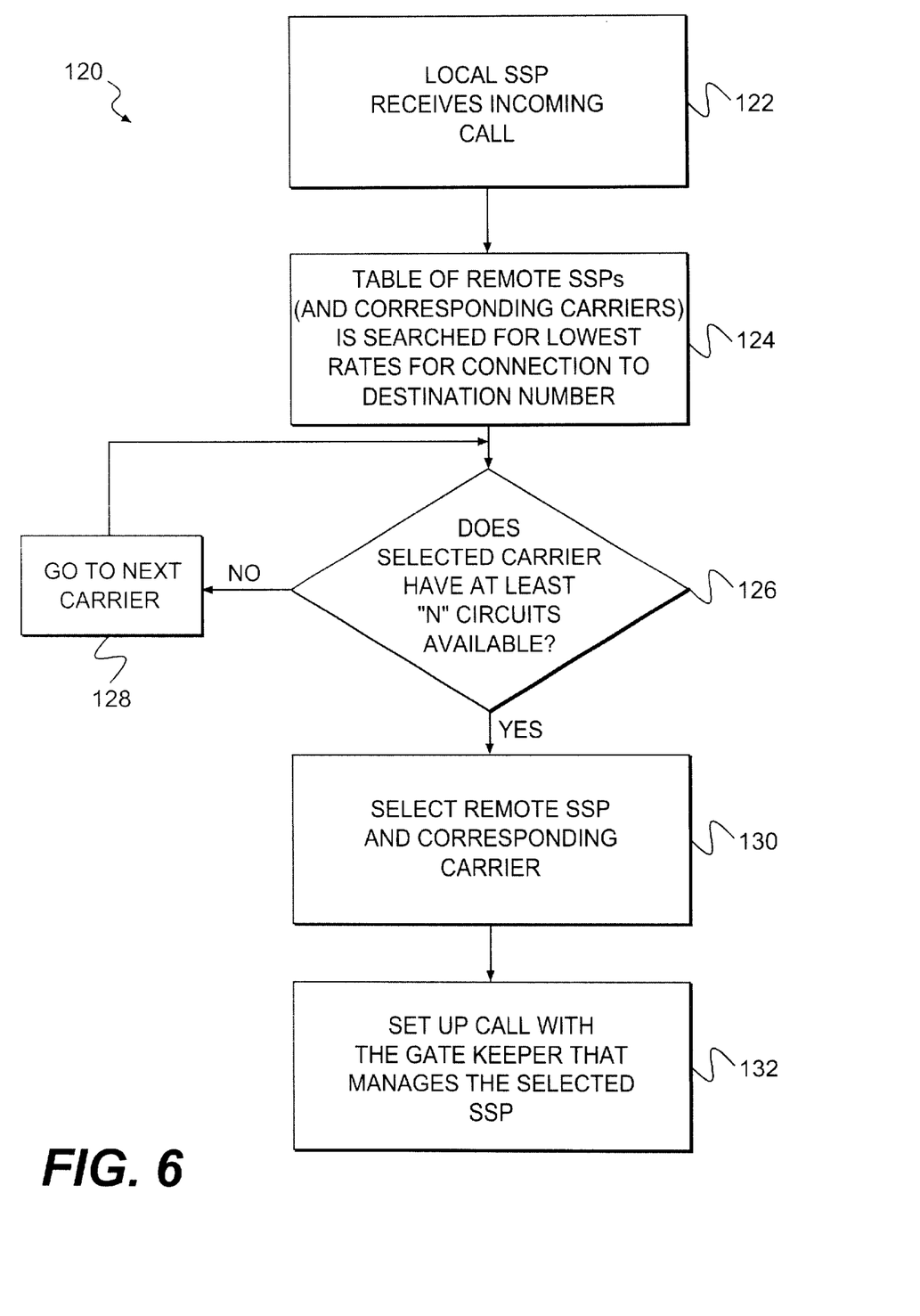
FIG. 6 is a flowchart illustrating a method of carrier selection in the network of the present invention.

Referring now to FIG. 6, a method of carrier selection is shown. After a local SSP receives an incoming call, at step 122, the SSP, at step 124, searches a locally stored list of remote network SSPs, and associated carriers, to determine which remote SSP and carrier combination has the lowest available rate. (The locally stored list or table is periodically updated as discussed above). Initially, the local SSP identifies which remote SSP and carrier combination has the lowest available rate. Next, at step 126, the local SSP determines whether the identified carrier has at least a threshold number "N" of circuits available. If not, the SSP, at step 128, identifies which remote SSP and carrier combination has the next lowest available rate and repeats step 128. If the SSP determines, at step 128, that the identified carrier has at least the threshold number "N" of circuits available, the SSP, at step 130, selects the identified remote SSP and carrier combination and, at step 132, connects the incoming call to the gatekeeper that manages the selected SSP and carrier combination.

Figure 7:
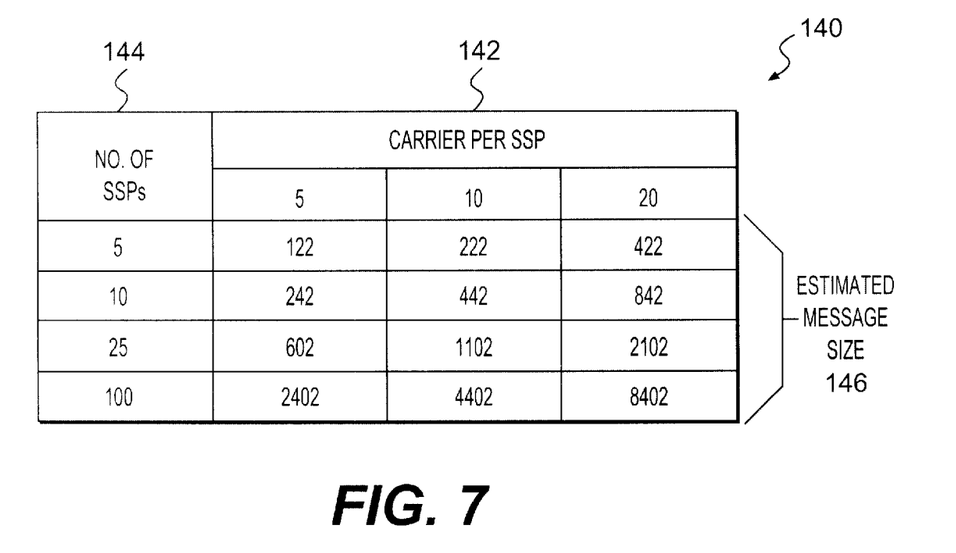
FIG. 7 is a table illustrating message size estimates for the ping/response communication between an SSP and an SMP of the present invention.

Referring now to FIG. 7, a table 140 of message size estimates is shown. The number of bytes per message 146 increases as the number of SSPs 144 increase and the number of carriers 142 per SSP increase. The number of bytes per message can be derived from the following equation:

$$\text{Bytes per message} = 4SC + 4S + 2$$

Wherein "S" is the number of SSPs in the system, and "C" is the number of carriers per SSP. As shown in table 140, there is a significant increase in the size of messages sent between the SMP and the SSPs as the number of SSPs and carriers per SSP increase. The increase in message size may overwhelm the SMP during cost and circuit availability updates.

Figure 8:
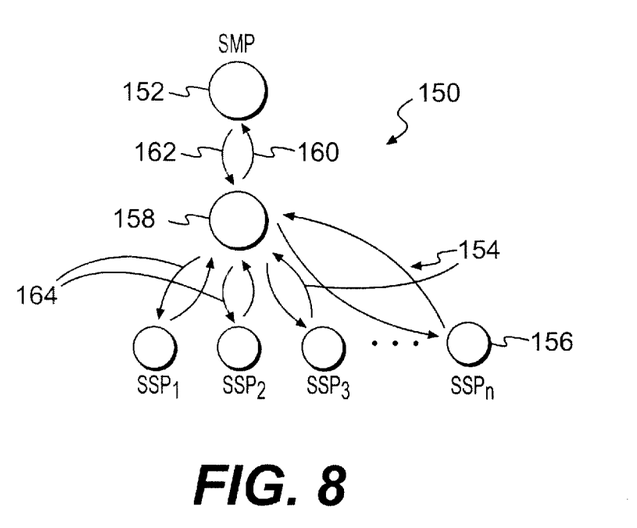
FIG. 8 is a diagrammatic view of a concentrator device positioned between the SMP and SSPs of the present invention.

Referring now to FIG. 8, a tree structure 150 is shown. The tree structure 150 reduces the possibility of an SMP 152 being overwhelmed by a plurality of messages 154 from a plurality of SSPs 156. The tree structure 150 includes a concentrator device 158 positioned between SMP 152 and SSPs 156. Concentrator device 158 collects updating ping signals 154 from each SSP 156 and transmits a global ping signal 160 to SMP 152. Global ping signal 160 contains circuit availability changes provided by updating ping signals 154. In response to receipt of global ping signal 160, SMP 152 updates its database (not shown) and transmits a global response signal 162 to concentrator device 158. Concentrator device 158, in turn, transmits multiple copies 164 of global response signal 162 to SSPs 156. As a result, concentrator device 158 reduces the burden that would otherwise be placed on SMP 152 if SMP 152 was required to transmit individual response signals to each SSP 156.

Although concentrator device 158 does relieve the burden on SMP 152, it should be noted that the latency of circuit availability changes is doubled by positioning concentration device 158 between SMP 152 and SSPs 156. For example, if a given ping signal is sent from an SSP to an SMP every 5 seconds and a response signal is sent from the SMP to the SSP every 5 seconds, the total latency period is 10 seconds. However, if a concentrator device is added between the SMP and the SSP the total latency period will increase to 20 seconds because of the addition of the global ping signal and the global response signal. Therefore, concentrator devices should be used in systems having a large number of SSPs and avoided in systems having a minimal number of SSPs.

An automatic call distribution environment is described below and is described in further detail in U.S. patent application Ser. No. 08/905,589 to Schumacher et al., incorporated herein in its entirety by reference.

In an automatic call distribution environment an Automatic Call Distributor (ACD) receives an incoming call and distributes the call to an available agent in a group. As described in U.S. patent application Ser. No. 08/905,589, the ACD intelligently distributes the incoming call based on a number criteria or rules. The rules may be changed in a dynamic fashion by users or system administrators, as desired, and multiple sets of rules for multiple groups, settings and situations are allowable. The following list describes the items (i.e., the rules structure) used by the intelligent call distribution method and system of the present invention in arriving at call distribution decisions.

Membership Type: This rule represents the member's role within a group, such as group supervisor, group member, or voice message handler. The membership type is extensible to reflect development and change in group roles.

Member Registration: This database is used to determine which subscribers are members of which particular groups. Subscribers not appearing in the member registration database are not members of any group.

Device Registration: This database tracks information specific to various wired and wireless devices, determines which wired or wireless devices are available, their current status, current location, who is using each device, and routing information.

User Registration: This database tracks information specific to subscribers in the groups, determines which device to use to reach them, their availability status, their location from a network and a geographic view. This database can also retain personal profiles of subscriber preferences relating to wireless ACD functions.

Current Group Status: This is the information about the function of the group as a whole. It describes how members in the group relate to each other—for example how members contact other group members. It also describes how calls are handled within the groups. For example calls may be distributed evenly to all members or delivered only to the next free agent. The database also contains a group profile of preferences relating to wireless ACD functions.

Call Status: This call-related information can help in determining how the call is processed and in what order. For example the call waiting for an agent the longest will be delivered to the next available agent, or calls from customers with priority contracts can be moved up to the beginning of the waiting queue.

Call State: This is information about a call at a particular instance. For example, the caller could have waited for an agent longer than some specified time. The call status would then change from a wait in queue state to a leave voice message state and would no longer be deliverable to an agent.

User Defined Registration: This is a customer defined or supplied database which contains objects to track for registration. The objects could be customer accounts and contain information about the sales representative, order status and receivables. For example, if an account is overdue, the call could be delivered to the group member who is responsible for collecting overdue accounts. This database can also contain user-defined object status information which can be changed according to the object's definition.

Individual Registration in a Group: Describes whether an individual is a member of a group and the individual's relationship with that group.

Device Registration: Tracks the devices available for intelligent call distribution. The device registration can be set either dynamically or statically, and can be addressed in a number of forms. This database also keeps track of the current status of the device, such as busy, not responding, etc., for use as one of the intelligent call delivery criteria.

User Registration: Tracks the individuals in a real time dynamic fashion and contains the association between individuals and their currently assigned devices, to which calls can be intelligently delivered. This database also keeps track of the current status of the individual such as busy or unavailable, to use as part of the intelligent call delivery.

Alerting: Indicates to one or more individuals within the group that a call event which is meaningful to the group has occurred. Example events include call arrival, call abandonment and call pickup by a member of the group. The intelligent call distribution mechanism will determine what subset of the group will receive an alerting indicator. This subset can be either the entire group, some particular subset, a single individual in the group, or a null group, leading to no alert.

Call Connect: Allows the individual within a group to communicate and talk with the caller via a number of telephone devices. Example devices include cellular telephones, wired telephones, and 2-way SMR. The calls can actually be moved from one device to another as disclosed in U.S. Pat. No. 5,140,626 to Ory et al., incorporated herein in its entirety by reference. The call can actually occur on multiple channels simultaneously depending on the communication medium used, such as voice, data or FAX. This invention proposes methods to associate these media to accomplish meaningful tasks with increased efficiency.

Status: A catchall category including a number of different data items in the ACD. It includes, for example, the status of current members, status of devices, calls in progress, call history, alerts, and alerts history. Status can be used for: resource (device, individual, group, channel) utilization and optimization; input into the intelligent call distribution mechanism; and use by group members for performing tasks (such as answering the next available caller) and planning activities (such as a work break).

ACD Interaction and Integration

The present invention extends least cost routing via a mixed packet and circuit switched system into an ACD environment. There are a number of ACD enhancements described below to address unique characteristics and requirements for providing ACD in a mixed packet and circuit switched system. It should be noted that the ACD may be embodied in hardware that is distinct from the mixed packet and circuit switched system illustrated in FIG. 1. It should also be noted that the ACD may be integral with one or more of the mixed packet and circuit system elements illustrated in FIG. 1 (e.g., SMP 14 and/or SSPs 28, 30, 32).

SMP Registration: Tracks the SMPs available for intelligent call distribution. The SMP registration can be set either dynamically or statically, and can be addressed in a number of forms. This database may also keep track of the SSPs associated with each SMP.

SSP Registration: Tracks the SSPs available for intelligent call distribution. The SMP registration can be set either dynamically or statically, and can be addressed in a number of forms. This database may also keep track of the carriers, gateway, and gatekeepers associated with each SSP.

Gatekeeper Registration: Tracks the Gatekeepers associated with each SSP. The Gatekeeper registration can be set either dynamically or statically, and can be addressed in a number of forms. This database may also keep track of the gateways associated with each Gatekeeper.

Gateway Registration: Tracks the gateways associated with each SSP. The gateway registration can be set either dynamically or statically, and can be addressed in a number of forms. This database may also keep track of the Gatekeepers associated with each gateway.

Carrier Registration: Tracks the carriers associated with each SSP. The carrier registration can be set either dynamically or statically, and can be addressed in a number of forms. This database may also keep track of the available circuits associated with each carrier.

Figure 9A:
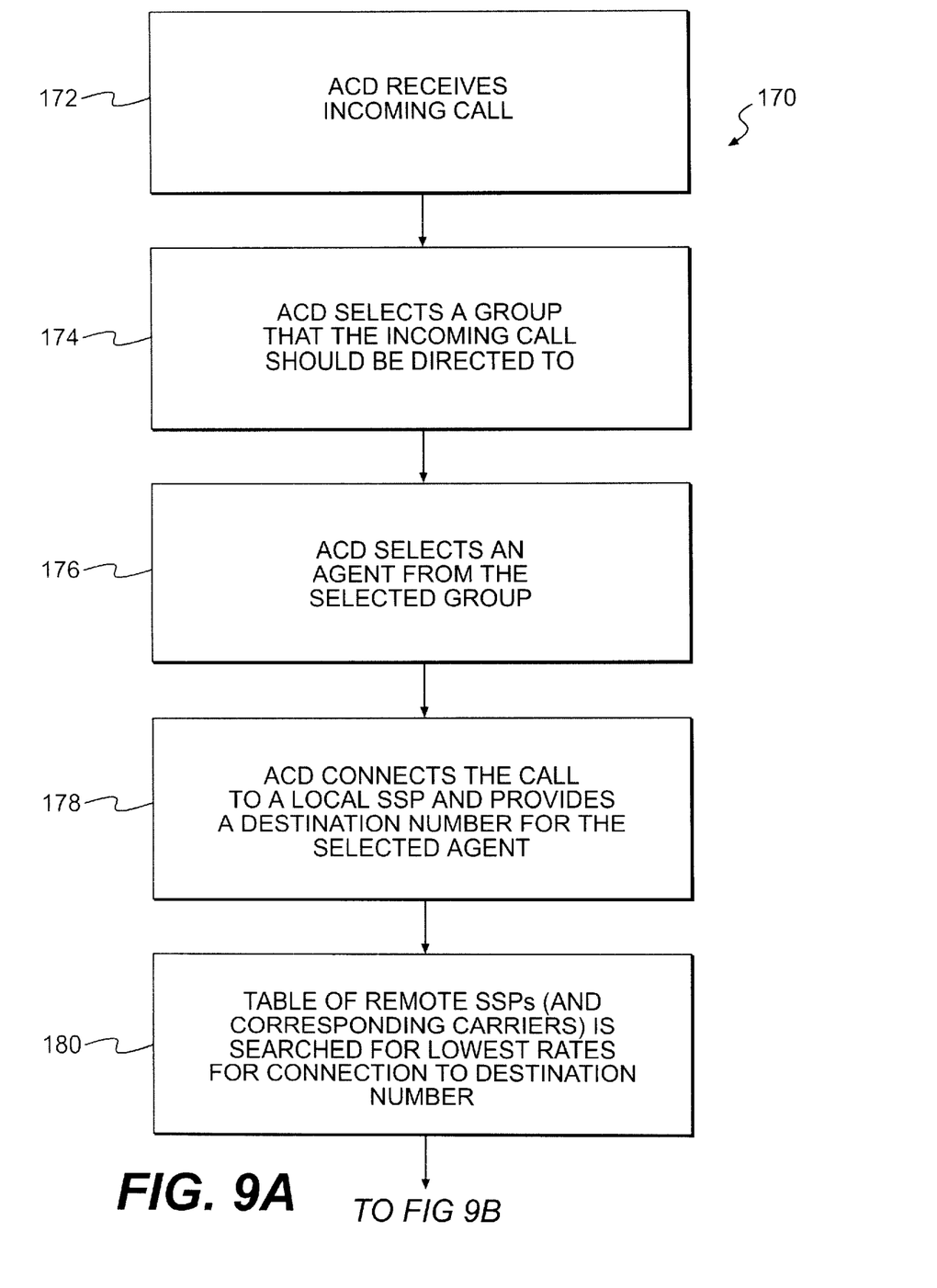
FIGS. 9A and 9B are flowcharts illustrating the use of the least cost routing system of the present invention in an automatic call distribution environment.

Referring now to FIG. 9A, a flowchart 170 illustrates the use of the least cost routing system of the present invention in an automatic call distribution environment. Initially, at step 172, the ACD receives an incoming call. Next, at step 174, the ACD selects a group that the incoming call should be directed to. Afterwards, at step 176, the ACD selects an agent from the selected group and, at step 178, connects the incoming call to a local SSP and provides the local SSP with a destination number for the selected agent. After the local SSP receives the incoming call, at step 178, the SSP, at step 180, searches a locally stored list of remote network SSPs, and associated carriers, to determine which remote SSP and carrier combination has the lowest available rate. (The locally stored list or table is periodically updated as discussed above). Initially, the local SSP identifies which remote SSP and carrier combination has the lowest available rate and continues to the portion of the flowchart 170 illustrated in FIG. 9B.

Figure 9B:
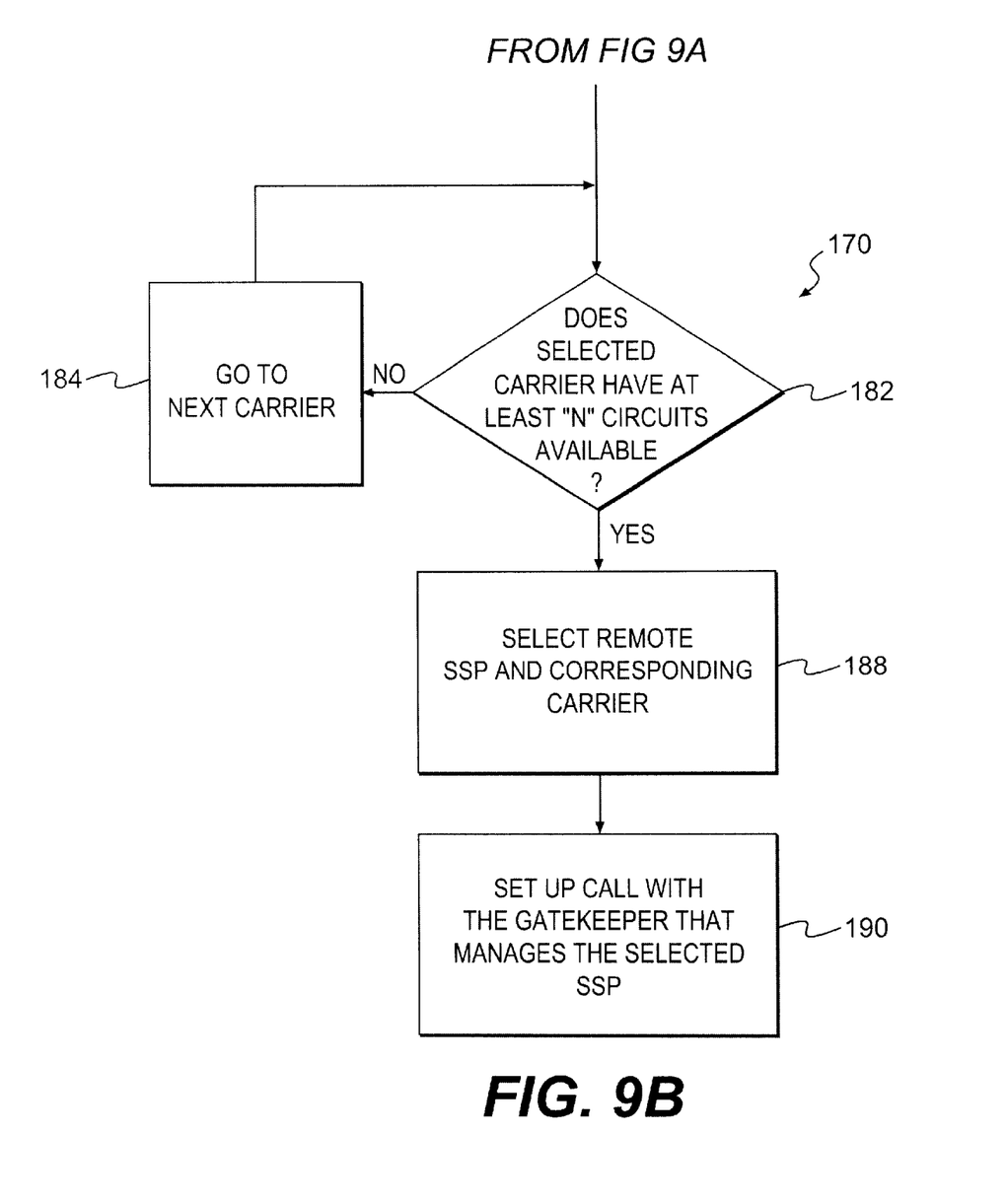

Referring now to FIG. 9B, the local SSP, at step 182, determines whether the identified carrier has at least a threshold number "N" of circuits available. If not, the SSP, at step 184, identifies which remote SSP and carrier combination has the next lowest available rate and repeats step 182. If the SSP determines, at step 182, that the identified carrier has at least the threshold number "N" of circuits available, the SSP, at step 188, selects the identified remote SSP and carrier combination and, at step 190, connects the incoming call to the gatekeeper that manages the selected SSP and carrier combination.

While the present invention has been described with reference to certain preferred embodiments, those skilled in the art will recognize that various modifications and other embodiments may be provided. These other embodiments are intended to fall within the scope of the present invention, and these variations upon and modifications to the embodiments described herein are provided herein are provided for by the present invention which is limited only by the following claims.

What is claimed is:

1. A method for routing a call from a local service switching point to a remote service switching point via a packet switch network interconnected to the remote service switching point by a gateway and a gatekeeper controlling call pathways through the gateway to the remote service switching point, the method comprising the steps of:
   providing the local service switching point with a record identifying a plurality of carriers serving the remote service switching point, the record including a cost for using each identified carrier and a number of available circuits in each identified carrier;
   receiving a call and destination number at the local service switching point; and
   selecting a carrier from the record, the selected carrier having a predetermined number of available circuits that can connect the received call to the destination number for the lowest cost.

2. The method of claim 1, further comprising the step of: routing the call to the selected carrier.

3. The method of claim 2, wherein the step of routing further comprises the steps of:
   prompting the gatekeeper to establish a call pathway from the packet switch network to the remote SSP via the gateway; and
   connecting the call from the local SSP to the selected carrier via the packet switched network, the gateway, and the remote SSP.

4. The method of claim 1, further comprising the step of: receiving the call from an automatic call distributor.

5. The method of claim 1, further comprising the step of: updating the record identifying the plurality of carriers serving the remote service switching point when a change in carrier service is detected.

6. The method of claim 5 wherein the change in carrier service is a change in the number of available circuits in an identified carrier.

7. The method of claim 5 wherein the change in carrier service is a change in the cost to use an identified carrier.

8. The method of claim 7 wherein the change in cost is based on a time of day a call is made.

9. The method of claim 7 wherein the change in cost is based on a day of week a call is made.

10. The method of claim 7 wherein the change in cost is based on a day of month a call is made.

11. The method of claim 7 wherein the change in cost is based on a prefix of the destination number.

12. The method of claim 7 wherein the change in cost is based on the local service switching point.

13. The method of claim 5 wherein the change in carrier service is an addition of an identified carrier serving the remote service switching point.

14. The method of claim 5 wherein the change in carrier service is a removal of an identified carrier serving the service switching point.

15. A system for routing a call from a local service switching point to a remote service switching point via a packet switched network interconnected to the remote service switching point by a gateway and a gatekeeper controlling call pathways through the gateway to the remote service switching point, the system comprising:
   means for providing the local service switching point with a record identifying a plurality of carriers serving the remote service switching point, the record including a cost for using each identified carrier and a number of available circuits in each identified carrier;
   means for receiving a call and destination number at the local service switching point; and
   means for selecting a carrier from the record, the selected carrier having a predetermined number of available circuits that can connect the received call to the destination number for the lowest cost.

16. The system of claim 15, further comprising:
   means for routing the call to the selected carrier.

17. The system of claim 16, wherein the means for routing further comprises:
   means for prompting the gatekeeper to establish a call pathway from the packet switched network to the remote SSP via the gateway; and
   means for connecting the call from the local SSP to the selected carrier via the packet switched network, the gateway, and the remote SSP.

18. The system of claim 15, further comprising:
   means for receiving the call from an automatic call distributor.

19. The system of claim 15, further comprising:
   means for updating the record identifying the plurality of carriers serving the remote service switching point when a change in carrier service is detected.

20. The system of claim 19 wherein the change in carrier service is a change in the number of available circuits in an identified carrier.

21. The system of claim 19 wherein the change in carrier service is a change in the cost to use an identified carrier.

22. The system of claim 21 wherein the change in cost is based on a time of day a call is made.

23. The system of claim 21 wherein the change in cost is based on a day of week a call is made.

24. The system of claim 21 wherein the change in cost is based on a day of month a call is made.

25. The system of claim 21 wherein the change in cost is based on a prefix of the destination number.

26. The system of claim 21 wherein the change in cost is based on the local service switching point.

27. The system of claim 19 wherein the change in carrier service is an addition of an identified carrier serving the remote service switching point.

28. The system of claim 19 wherein the change in carrier service is a removal of an identified carrier serving the service switching point.

29. A mixed circuit and packet switched system, the system comprising:
a packet switched network;
a circuit switched network having a plurality of carriers, each carrier containing a dynamically varying number of available circuits;
a plurality of service switching points in communication with the circuit switched network, each service switching point associated with a carrier such that each service switching point can direct a telephone call over an available circuit in the associated carrier, each service switching point containing a global circuit availability record, the global circuit availability record providing circuit availability for every carrier associated with the plurality of service switching points;
a plurality of gateways interconnecting the packet switched network and the circuit switched network, each gateway in communication with a service switching point such that a telephone call can be carried between the service switching point and the packet switched network via the gateway;
a plurality of gatekeepers, each gatekeeper in communication with a gateway such that each gatekeeper controls a connection of a telephone call between the packet switched network and the circuit switched network via the gateway, each gatekeeper in communication with a service switching point such that the gatekeeper permits the connection of the telephone call through the gateway in response to a prompt from the service switching point; and
wherein a first service switching point receives an incoming call on an associated carrier and directs the received call, via the packet switched network, to a gateway in communication with a second service switching point after prompting a gatekeeper in communication with the gateway, the first service switching point selecting the second service switching point from the plurality of service switching points based on a global circuit availability record contained in the first service switching point.

30. The system of claim 29 wherein each service switching point maintains a circuit availability record for its associated carrier.

31. The system of claim 30, further comprising:
a system management point in communication with the plurality of service switching points, the system management point receiving the circuit availability records from the plurality of service switching points, deriving the global circuit availability record from the received circuit availability records, and transmitting the global circuit availability data record to each service switching point.

32. The system of claim 31 wherein the system management point periodically receives the circuit availability records from the plurality of switching points, updates the global circuit availability record if there is change in circuit availability, and transmits the global circuit availability record if an update has occurred.

33. The system of claim 32 wherein the change in circuit availability is a change in the number of available circuits in a carrier.

34. The system of claim 32 wherein the change in circuit availability is a change in a cost to use an available circuit in a carrier.

35. The system of claim 34 wherein the change in cost is based on a time of day a call is made.

36. The system of claim 34 wherein the change in cost is based on a day of week a call is made.

37. The system of claim 34 wherein the change in cost is based on a day of month a call is made.

38. The system of claim 34 wherein the change in cost is based on a destination number prefix.

39. The system of claim 34 wherein the change in cost is based on a class of call.

40. The system of claim 34 wherein the change in cost is based on an originating service switching point.

41. The system of claim 29 wherein the first service switching point directs the received call to the gateway in communication with the second service switching point only if the global circuit availability record indicates that a carrier associated with the second service switching point has at least a predetermined number of available circuits.

42. The system of claim 41 wherein the first service switching point directs the received call to the gateway in communication with the second service switching point only if the global circuit availability record indicates that a carrier associated with the second service switching point has a predetermined number of circuits that are available for a predetermined cost.

43. The system of claim 29 wherein the first service switching point directs the received call to the gateway in communication with the second service switching point only if the global circuit availability record indicates that a carrier associated with the second service switching point has at least one circuit that is available for a predetermined cost.

44. A system for routing a call via a packet switched network having a gateway and a gatekeeper controlling call pathways through the gateway, the system comprising:
a remote service switching point;
a local service switching point in communication with the remote gateway and the remote gatekeeper via the packet switched network, the local service switching point containing a global record identifying a plurality of carriers that serve the remote service switching point, the global record including a cost of using each identified carrier and a number of available circuits in each identified carrier; and
wherein the local service switching point selects a carrier from the global record in response to receiving an incoming call and a destination number, the selected carrier having a predetermined number of circuits that can connect the incoming call to the destination number for the lowest cost.

45. The system of claim 44 wherein the local service switching point establishes a call route to the remote service switching point by prompting the gatekeeper to establish a call pathway from the packet switched network to the remote service switching point via the gateway, the established call route extending from the local service switching point to the remote service switching point via the packet switched network and the gateway.

46. The system of claim 45 wherein the local service switching point directs the incoming call over the established call route to the remote service switching point.

47. The system of claim 46 wherein the remote service switching point connects the incoming call to a circuit in the selected carrier in response to receiving the incoming call from the local service switching point.

48. The system of claim 44, further comprising:
an automatic call distributor in communication with the local service switching point, the automatic call distributor initially receiving the incoming call and directing the incoming call to the local service switching point.

49. The system of claim 44 wherein the remote service switching point maintains a carrier record identifying the plurality of carriers that serve the remote service switching point, the carrier record including the cost of using each identified carrier and the number of available circuits in each identified carrier.

50. The system of claim 49, further comprising:

a system management point in communication with the local service switching point and the remote service switching point, the system management point receiving the carrier record from the remote service switching point, deriving the global record from the carrier record, and transmitting the global record to the local service switching point.

51. The system of claim 50 wherein the system management point derives the global record from a plurality of carrier records received from a plurality of remote service switching points in communication with the system management point.

52. The system of claim 50 wherein the system management point periodically receives the carrier record from the remote service switching point, derives the global record from the carrier record if there is a change in the carrier record, and transmits the global record to the local service switching point.

53. The system of claim 52 wherein the change in the carrier record is a change in a number of circuits available in a carrier.

54. The system of claim 52 wherein the change in the carrier record is a change in a cost to use a carrier.

55. The system of claim 54 wherein the change in the cost is based on a time of day a call is made.

56. The system of claim 54 wherein the change in the cost is based on a day of week a call is made.

57. The system of claim 54 wherein-the change in the cost is based on a day of month a call is made.

58. The system of claim 54 wherein the change in the cost is based on a destination number prefix.

59. The system of claim 54 wherein the change in the cost is based on a class of call.

60. The system of claim 54 wherein the change in the cost is based on an originating service point.

* * * * *